United States Patent [19]

Guskov et al.

[11] Patent Number: 4,786,273
[45] Date of Patent: Nov. 22, 1988

[54] COGGED BELT WITH REINFORCING MEMBERS

[75] Inventors: Valery V. Guskov; Gennady G. Kozachevsky; Vladimir P. Boikov; Oleg I. Molodan; Svetlana I. Sizova; Petr P. Kasperovich, all of Minsk, U.S.S.R.

[73] Assignee: Belorussky Politekhnichesky Institut, Minsk, U.S.S.R.

[21] Appl. No.: 82,864
[22] PCT Filed: Sep. 19, 1985
[86] PCT No.: PCT/SU85/00077
§ 371 Date: May 11, 1987
§ 102(e) Date: May 11, 1987
[87] PCT Pub. No.: WO87/01778
PCT Pub. Date: Mar. 26, 1987
[51] Int. Cl.$^4$ .............................................. F16G 1/08
[52] U.S. Cl. ................................. 474/268; 474/205
[58] Field of Search .............. 474/205, 265, 268, 270, 474/240, 242, 244, 201, 260, 261–263

[56] References Cited

U.S. PATENT DOCUMENTS

| 2,189,049 | 2/1940 | Ungar | 474/270 X |
| 2,300,706 | 11/1942 | Schott | 474/256 |
| 4,198,875 | 4/1980 | Schneider | 474/205 |

FOREIGN PATENT DOCUMENTS

| 3411772 | 5/1985 | Fed. Rep. of Germany | 474/205 |
| 1033794 | 8/1983 | U.S.S.R. | |
| 1073511 | 2/1984 | U.S.S.R. | 474/205 |

Primary Examiner—Thuy M. Bui
Attorney, Agent, or Firm—Fleit, Jacobson, Cohn & Price

[57] ABSTRACT

A cogged belt comprising an elastic base (1) which incorporates a carrying element in the form of a strip (2) with crimped lugs (4), and inserts (6) for reinforcing the cogs of the belt, and which are (3) connected to the strip (2) by these lugs (4). The lugs (4) are arranged at the outer opposite sides of the strip (2) laterally of the cogs (3). The lugs (4) are interconnected by a pin (5) having an insert (6) mounted thereon.

3 Claims, 2 Drawing Sheets

COGGED BELT WITH REINFORCING MEMBERS

FIELD OF THE INVENTION

This invention relates generally to mechanical engineering, and more particularly to cogged belts.

BACKGROUND OF THE INVENTION

There is known a cogged belt comprising an elastic base which incorporates a carrying element and an element reinforcing the belt cogs. The carrying element has the form of a strip fabricated from metal or polymeric material. The strip has slots in the zone of the cogs to form lugs crimped to the inside of the cogs for reinforcement. These slots are made so that the lugs are crimped laterally of the carrying strip. An insert is further provided between the lugs to impart a higher rigidity to the cogs (cf., USSR Inventor's Certificate No. 1,033,794, published Aug. 7, 1983 in Bulletin "Discoveries, Inventions, Industrial Designs, Trademarks" No. 29).

However, the aforedescribed cogged belt suffers from insufficient carrying capacity, since the carrying element has ports at cog locations, which weaken the cogs cross-sectionally.

SUMMARY OF THE INVENTION

The present invention is therefore aimed at providing a cogged belt in which the cogs would be so reinforced as to substantially increase the carrying capacity and extend the service life of the cogged belt.

The aims of the invention are attained by that in a cogged belt comprising an elastic base which incorporates a carrying element in the form of a strip with crimped lugs and inserts to reinforce the cogs of the belt; and which are connected to the strip by these lugs, according to the invention, the lugs are arranged at the outer opposite sides of the strip transversely of the cogs and interconnected by a pin, whereas the insert is mounted on this pin.

In order to connect ends of the carrying strip, the lugs at the ends of the strip are arranged so that the distance between the opposite lugs disposed at one end of the strip is greater than the distance between the opposite lugs disposed at the other end of the strip by twice the thickness of the strip.

Such a connection between the strip ends is structurally most simple and reliable for ensuring high carrying capacity of the cogged belt.

Alternatively, the strip is provided along its width in parallel with the strips with additional lugs having holes therein to receive the pin connecting the lugs, whereas the insert is capable of lateral detachment.

The provision of additional lugs is especially important when transmitting high torques at relatively low bending loads, especially in the area of connection between the ends of the carrying strip.

The cogged belt embodying the present invention, while being simple in construction, offers a high carrying capacity.

BRIEF DESCRIPTION OF THE DRAWINGS

The invention will now be described in greater detail with reference to a specific embodiment thereof taken in conjunction with the accompanying drawings, in which.

BEST MODE OF CARRYING OUT THE INVENTION

Figure 1:
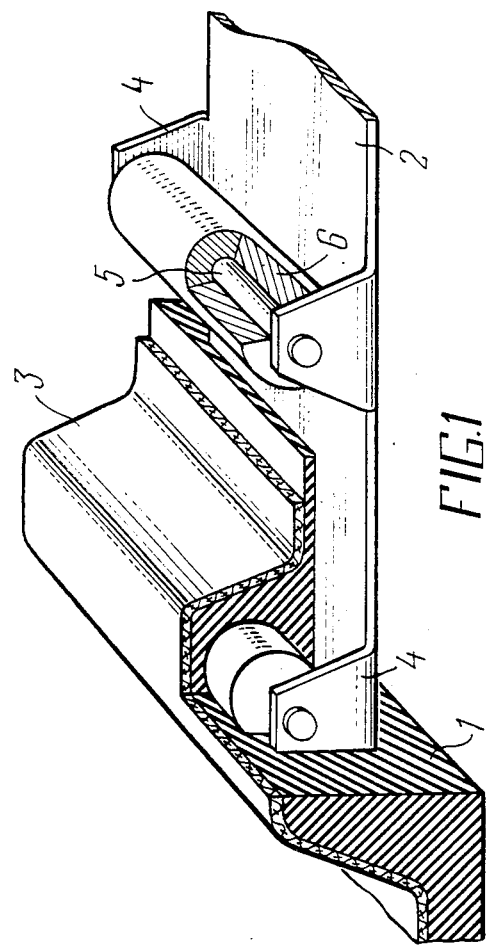
FIG. 1 is an axonometric partially cut-away view of a cogged belt according to the invention.
Figure 2:
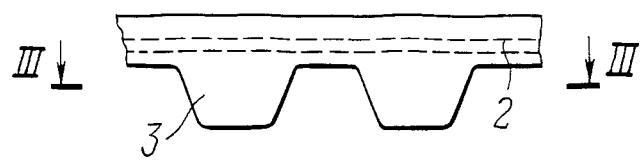
FIG. 2 is a side view of the cogged belt according to the invention.
Figure 3:
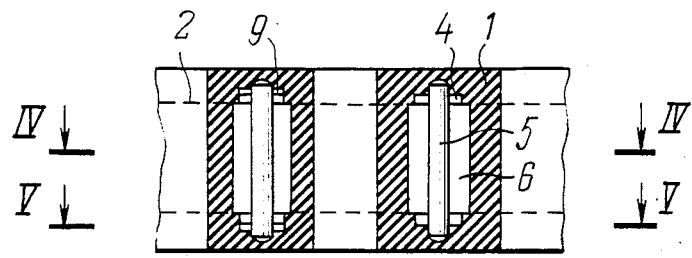
FIG. 3 is a section taken along the line III—III in FIG. 2.

A toothed belt comprises an elastic base 1 (FIG. 1) incorporating a carrying element in the form of a strip 2 fabricated from metal or polymeric material, and cogs 3. For reinforcing each cog 3 (FIGS. 1 and 2) the belt 2 is provided at the opposite outer sides thereof with lugs 4 (FIGS. 1 and 3). The lugs 4 are interconnected by a pin element 5 having an insert 6 mounted thereon.

Ends "a" (FIGS. 4 and 5) and "b" of the strip 2 are connected in a lap joint, and in the zone of the cog 3, the lugs 4 (FIG. 5) at the end "a" and lugs 9 at the end "b" are so arranged that the distance between the lugs 9 (FIG. 3) at the end "b" (FIG. 4) of the carrying strip 2 is greater than the distance between the lugs 4 (FIG. 3) at the end "a" (FIG. 4) of the belt 2 by twice the thickness h (FIG. 4) of the strip 2.

Figure 4:
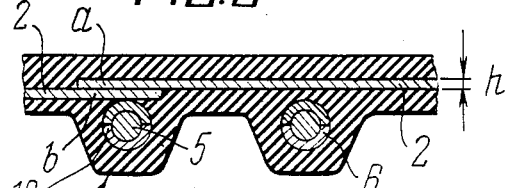
FIG. 4 is a section taken along the line IV—IV in FIG. 3.
Figure 5:
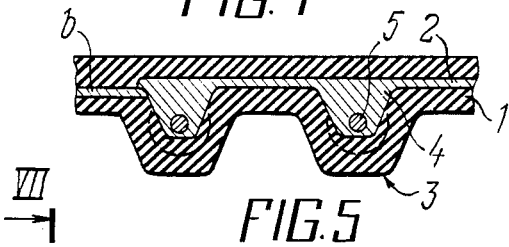
FIG. 5 is a section taken along the line V—V in FIG. 3.
Figure 6:
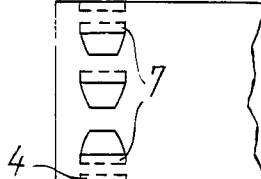
FIG. 6 is a top plan view of an end of the carrying element.
Figure 7:
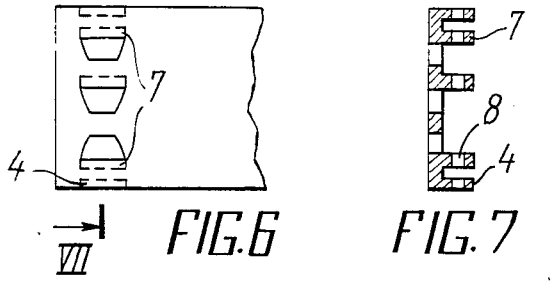
FIG. 7 is a section taken along the line VII—VII in FIG. 6.

In order to ensure a higher rigidity of the cog 3, the strip 2 is provided with additional lugs 7 (FIGS. 6,7) extending through the width of the strip 2 and running in parallel with the lugs 4. The lugs 7 have through holes 8 (FIG. 7) to receive the pin 5 (FIG. 4). In this arrangement an insert 10 is detachable laterally.

The cogged belt according to the invention operates in the following manner.

During operation of the proposed cogged belt transmission the cogs 3 of the belt engage with teeth of a pulley (not shown) to result in the transmission of power. The cogs 3 of the belt, while engaging with the pulley teeth, take up a tangential force causing formation of fatigue cracks at the base of the cog 3. By virtue of embedding inside the belt cogs 3 of the inserts 6 connected to the strip 2 by means of the lugs 4 and pins 5, shear stresses normally arising in cogged belts of prior art constructions are replaced by compressive stresses, whereby fatigue cracks at the cog base are prevented to result, along with increased carrying capacity of the cogged belt, in a substantially longer service life thereof.

Provision of the lugs 4 at the outer sides of the strip 2 ensures its integrity, which extends the service life of the cogged belt according to the invention.

Provision of the lugs 7 along the width of the strip 2 in parallel with the lugs 4 ensures reduction in the magnitude of bending loads in the zone of the cog 3 as the cogged belt bends about the pulley, especially important at the point of connection of the ends of the carrying strip.

INDUSTRIAL APPLICABILITY

The invention is most applicable for use in cogged belt power transmissions.

We claim:

1. A cogged belt comprising an elastic base which incorporated a carrying element in the form of a strip with crimped lugs and inserts for reinforcing cogs of the belt, and which are connected to the strip by the lugs, wherein the lugs are arranged at outer opposite sides of the strip transversely aligned with the cogs and interconnected by respective pins and wherein the respective inserts are mounted on the respective pins.

2. A cogged belt as claimed in claim 1, wherein the distance between oppositely disposed lugs at one end of the strip is greater than the distance between oppositely disposed lugs at the other end of the strip by twice the thickness of the strip.

3. A cogged belt as claimed in claim 1, wherein the strip is provided with additional lugs between the crimped lugs, the additional lugs having holes through which the respective pins extend.

* * * * *